(12) United States Patent
Lang et al.

(10) Patent No.: US 11,231,097 B2
(45) Date of Patent: Jan. 25, 2022

(54) DIFFERENTIAL ARRANGEMENT AND METHOD OF INFLUENCING THE OVERALL TORQUE OF A SHAFT USING A DIFFERENTIAL ARRANGEMENT

(71) Applicant: DEERE & COMPANY, Moline, IL (US)

(72) Inventors: Matthias Lang, Mannheim (DE); Rainer Gugel, Plankstadt (DE); David Mueller, Stutensee (DE)

(73) Assignee: DEERE & COMPANY, Moline, IL (US)

( * ) Notice: Subject to any disclaimer, the term of this patent is extended or adjusted under 35 U.S.C. 154(b) by 150 days.

(21) Appl. No.: 16/180,105

(22) Filed: Nov. 5, 2018

(65) Prior Publication Data

US 2019/0136953 A1 May 9, 2019

(30) Foreign Application Priority Data

Nov. 7, 2017 (DE) .......................... 102017219758.7

(51) Int. Cl.
| | | |
|---|---|---|
| *G06F 7/00* | (2006.01) | |
| *F16H 48/36* | (2012.01) | |
| *F16H 48/20* | (2012.01) | |
| *F16H 48/38* | (2012.01) | |
| *H02K 7/02* | (2006.01) | |
| *H02K 49/10* | (2006.01) | |

(52) U.S. Cl.
CPC ............. *F16H 48/36* (2013.01); *F16H 48/20* (2013.01); *F16H 48/38* (2013.01); *F16H 2048/364* (2013.01); *F16H 2048/385* (2013.01); *H02K 49/102* (2013.01)

(58) Field of Classification Search
CPC .......... F16H 48/36; F16H 48/20; F16H 48/38; F16H 2048/364; F16H 2048/385; H02K 49/102
USPC ................................................ 701/36; 310/74
See application file for complete search history.

(56) References Cited

U.S. PATENT DOCUMENTS

| | | | | |
|---|---|---|---|---|
| RE34,209 E | * | 3/1993 | McGarraugh | ........... F16H 3/721 |
| | | | | 475/84 |
| 6,297,575 B1 | | 10/2001 | Yang | |
| 2005/0070391 A1 | * | 3/2005 | Folsom | ................ B60K 17/105 |
| | | | | 475/23 |
| 2006/0276298 A1 | * | 12/2006 | Rodgers | .................. F16C 25/06 |
| | | | | 475/231 |
| 2008/0030090 A1 | | 2/2008 | Abe et al. | |
| 2011/0037333 A1 | * | 2/2011 | Atallah | .................. H02K 51/00 |
| | | | | 310/98 |

(Continued)

FOREIGN PATENT DOCUMENTS

| | | |
|---|---|---|
| DE | 102005007650 A1 | 8/2006 |
| DE | 102008000672 A1 | 9/2009 |
| JP | 2007098987 A | 4/2007 |
| WO | 2007021802 A1 | 2/2007 |

OTHER PUBLICATIONS

IP.com Search—Feb. 9, 2021 (Year: 2021).*

(Continued)

*Primary Examiner* — Mahmoud S Ismail

(57) ABSTRACT

A differential arrangement having a gear stage that includes at least one input element and at least two output elements is provided. The at least one output element is connected to at least one electrical device in order to distribute torque.

15 Claims, 4 Drawing Sheets

(56) References Cited

U.S. PATENT DOCUMENTS

| | | | | |
|---|---|---|---|---|
| 2011/0127095 A1* | 6/2011 | Imamura | ............ | B60W 10/105 180/65.285 |
| 2014/0015362 A1* | 1/2014 | Cheng | ................. | H02K 49/102 310/99 |
| 2014/0162842 A1* | 6/2014 | Severinsson | ......... | B60W 10/16 477/35 |
| 2014/0183996 A1* | 7/2014 | He | ......................... | B60L 50/30 310/74 |
| 2014/0315675 A1 | 10/2014 | Watanabe | | |
| 2016/0079836 A1* | 3/2016 | Aoyama | ................ | H02K 11/33 310/68 D |
| 2018/0328447 A1* | 11/2018 | Dieckhoff | ........... | H02K 49/102 |

OTHER PUBLICATIONS

J. Karner, M. Baldinger, and B. Reichl, Prospects of Hybrid Systems on Agricultural Machinery, GSTF Journal on Agricultural Engineering, dated Feb. 2014, 5 pages, vol. 01.

European Search Report issued in counterpart application No. 18203164.1 dated Feb. 19, 2019. (17 pages).

German Search Report issued in counterpart application No. 102017219758.7 dated Jun. 17, 2020 (10 pages).

Karner et al., Hybrid systems for Agricultural Engineering, Landtechnik, dated 2013, pp. 22-25.

Hybridantriebe für mobile Arbeitsmaschinen (Hybrid Drives for Mobile Work Equipment), Feb. 20, 2013, 190 pages.

* cited by examiner

DIFFERENTIAL ARRANGEMENT AND METHOD OF INFLUENCING THE OVERALL TORQUE OF A SHAFT USING A DIFFERENTIAL ARRANGEMENT

RELATED APPLICATION

This application claims priority under 35 U.S.C. § 119 to German patent application DE 102017219758.7, filed Nov. 7, 2017, the disclosure of which is incorporated herein by reference in its entirety.

BACKGROUND

The differential gear, or differential for short, is an epicyclic gear unit having an input element that may act as a drive and two output elements that may act as driven shafts. The differential is most commonly used as an axle differential in motor vehicles. The purpose there is to drive the wheels in such a manner that they rotate at different speeds in curves.

Like its base type, the planetary gear unit, the differential has at least three shafts. Its peculiar feature is that the fixed-carrier transmission ratio is generally −1. The fixed-carrier transmission ratio is the designation for the transmission ratio between the two output shafts when the planet carrier (arm, cage, or basket) is held stationary. With a fixed-carrier transmission ratio of −1, the gear unit in three-shaft mode distributes the output power from the carrier arm to the two output shafts with an equally large torque point. If the two output gear wheels are of equal size, the gear unit structure is symmetrical.

The problem addressed by the present disclosure is that of specifying a differential arrangement in which a distribution of torque to output elements can be dynamically varied.

SUMMARY

Various aspects of embodiments of the present disclosure are set out in the claims.

In accordance with an embodiment of the present disclosure, a differential arrangement has a gear stage including at least one input element and at least two output elements. At least one output element is connected to at least one electrical device in order to distribute torque.

In accordance with an embodiment of the present disclosure, a method of influencing the overall torque of a shaft using a differential arrangement having a gear stage with at least one input element and at least two output elements is provided. At least one output element of the at least two output elements is connected to at least one electrical device. The method includes combining a differential lock with the at least one electrical device.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

At least one embodiment of the subject matter of this disclosure is understood by referring to FIGS. 1 through 4 of the drawings.

Figure 1:
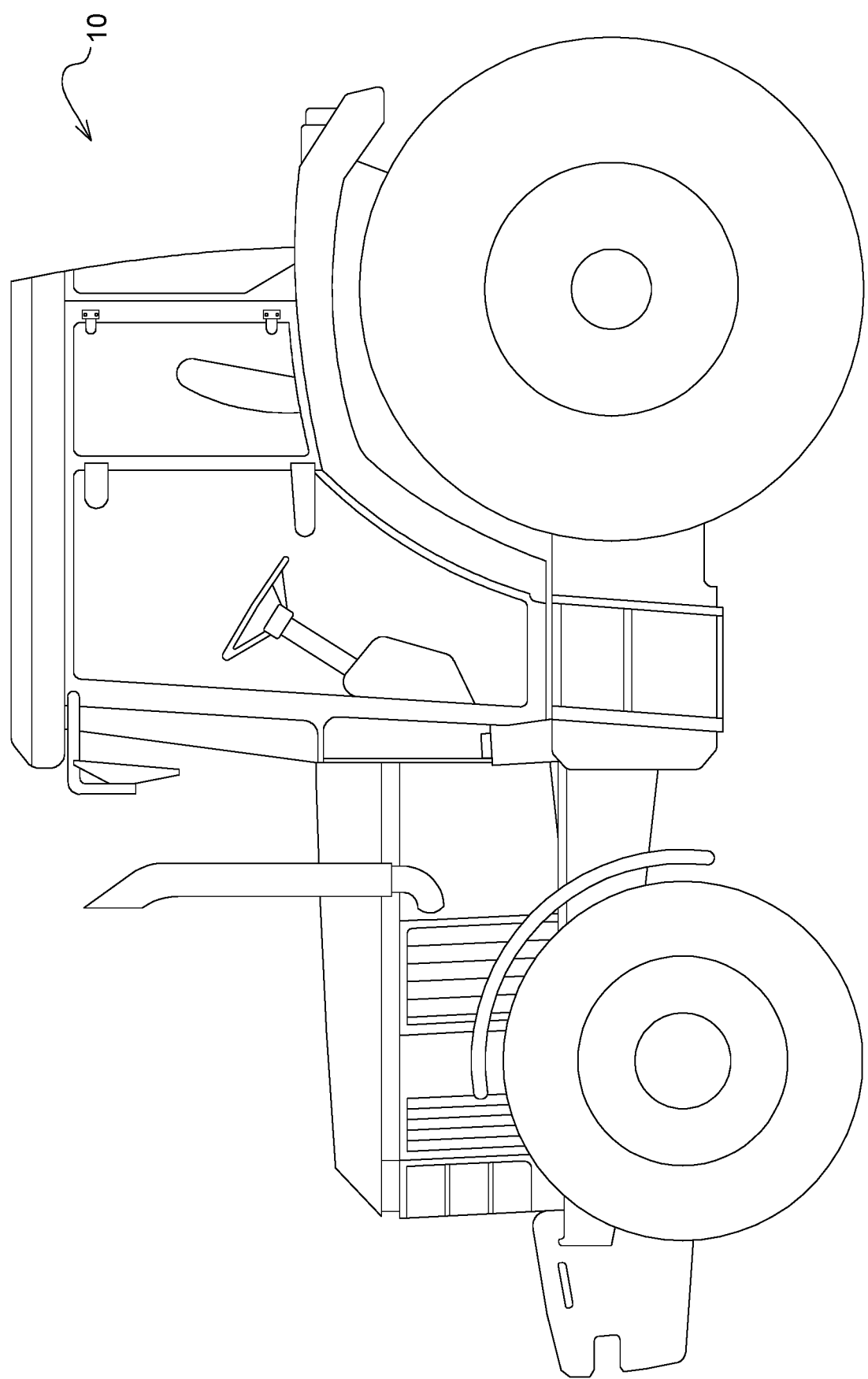
FIG. 1 illustrates a utility vehicle in accordance with an embodiment of the present disclosure.

FIG. 1 shows an agricultural utility vehicle 10 in which the differential arrangement 24 according to the present disclosure is used. The differential is normally located between the wheels. The driven output shafts lead to the wheels. Both wheels are driven with equal torque, even if they rotate at different speeds. With an equal rotational speed, the wheels of the differential gear unit do not cause any loss of power or any wear, because they do not move relative to one another.

A limited-slip differential is the term for a differential gear that, in contrast to the generally free running, open differential gear unit, runs stiffly to a certain extent. It decelerates abruptly-occurring increases of rotational speed on a driven wheel that, for example, has transiently lost adhesion to the ground due to bouncing. The task of a limited-slip differential is to supply minimum drive torque to each wheel and nevertheless permit different rotational speeds on both wheels.

When differentials are used, it can be advantageous to dynamically change the distribution of the torque to the two axles. This can be, for example, a dynamic distribution of torque to the front and rear axles by means of a central differential, depending on a pitch angle, the instantaneous acceleration or a dynamic distribution of torque to a right-hand and a left-hand wheel. This can be used for a targeted support or suppression of cornering. This is known as torque vectoring.

Torque vectoring is generally the active influencing of the yawing angle of vehicles, or the yawing angle speed. It makes it possible to additionally control a motor vehicle by deliberately distributing drive torque differently to the left-hand and right-hand wheels.

A conventional open differential may always distribute drive torques equally. The left-hand and right-hand wheels may always transmit the same torque, whereby the torque transmission is free of yawing torques.

In a limited-slip differential on the other hand, torque can be shifted from the wheel rotating faster to the wheel rotating more slowly. When cornering, steering effects occur in this way. If the slower wheel receives more drive torque during normal cornering, this means that a vehicle with a limited-slip differential opposes steering movements and tends to understeer, or to put it in positive terms, it has better directional stability. If high transverse accelerations occur in a differential, the wheel on the interior of the curve is relieved and tends to spin. When a limited-slip differential is used, a large portion of the torque is directed to the wheel on the outer side of the curve, which creates an inward-turning yawing torque during acceleration and an outward-turning yawing torque in overrun mode.

Torque-vectoring systems, which are also referred to as active yaw systems, are electronically controlled such that the cornering is deliberately supported or suppressed. Such a system thus also contains the functions of an electronically controlled limited-slip differential. For the purpose of redistribution, a part of the drive torque is directly routed from the differential housing to the desired wheel.

Hybrid systems for agricultural utility vehicles are described in the journal Landtechnik 68 (1), 2013, pp. 22-25, Karner et al. It is stated there that power distribution systems can be advantageous for applications that require a variable rotational speed within a certain range. The range variability can be implemented with planetary gear units by speed superimpositions. The main power can be transmitted by a mechanical shaft. An electric motor can be used to adapt the provided power to the corresponding power requirement.

In GSTF Journal on Agricultural Engineering (JAE), Vol. 1, No. 1, February 2014, pp. 33-37, Karner et al. also describes hybrid systems for agricultural utility vehicles with power distribution systems, which require a variable rotational speed within a certain range. A combination of a mechanically driven shaft and an electric motor for providing a variable power requirement is used.

Hybrid drives for agricultural utility vehicles in which differential gears are also used are described in the Karlsruhe publication series Fahrzeugsystemtechnik 15, 4th Expert Meeting on Hybrid Drives for Mobile Agricultural Working Machines, Karlsruhe, Feb. 20, 2013.

According to the present disclosure, at least one output element for distributing torque is connected to an electrical device. One of the two output shafts may be connected to an electrical device. In a preferred variant of the present disclosure, the electrical device is an electrical machine. The torque routed to this shaft can be controlled by means of the design according to the present disclosure. This enables a distribution of the torques to the output elements. It is possible to modify the distribution of the torque dynamically.

The input element may be a sum shaft and is mechanically driven. Each output element may be connected to a shaft.

In an embodiment, the first electrical device, which is coupled to at least one output element, is connected to at least one additional electrical device. While only one output shaft may be coupled to an electrical machine, it is nevertheless possible to influence not only this output shaft, but also to supply the tapped power to the additional electrical device due to the connection to the additional electrical device. The power that is tapped at one output shaft, when the shaft is braked for example, can be guided in a circuit and supplied to the additional electrical device, such as an alternator. Thus the power is available as additional input power. Such a system can be referred to as circulating reactive power. This circulating reactive power can be tapped at one side and then supplied to the other side. This makes a distribution of torque possible. Thus one can allow more torque to be fed to one output shaft and correspondingly less to the other one by tapping the torque at one output shaft and feeding it accordingly to the other output shaft. Due to the circulating reactive power, the tapped torque is thus additionally applied to the other side. This makes a distribution of torque possible, even if the differential itself distributes the torque in a 1:1 ratio. The combination of a differential with at least one electrical device or machine or multiple electrical machines, creates an arrangement which enables a targeted distribution of torque or power.

The output elements may be arranged longitudinally or transversely relative to the input element. In particular, the output elements are output shafts that are designed to be longitudinal and/or transverse relative to an input element designed as an input shaft.

In an embodiment of the present disclosure, at least one gear stage is designed as a magnetic three shaft epicyclic gear unit. It has proved to be particularly advantageous if the magnetic three shaft epicyclic gear unit has a first ring with a first number of pole pairs, a second ring with a second number of pole pairs and a third ring with a number of pole rods. The pole rods are arranged such that they modulate a magnetic field between the pole pairs.

In an embodiment of the present disclosure, an outer ring forms a difference shaft, and coils may be arranged around the outer ring.

In this embodiment of the present disclosure, a magnetic gear stage is used in three-shaft operation as a differential gear unit. Because undesirable side effects can occur in magnetic gear stages at the whole-number fixed-carrier transmission ratios of −1 or +2 that are necessary in axle differentials, it is desirable to implement fixed-carrier transmission ratios that are close to −1 or +2, but do not exactly represent these values. The arrangement according to the present disclosure enables the distribution of torque to two wheels of an axle with fixed-carrier transmission ratios of not exactly −1 or +2. The asymmetric distribution is compensated according to the present disclosure by coupling an output element to at least one electrical machine. This coupling can also be used for torque vectoring or to accelerate or decelerate the entire axle.

In an embodiment of the present disclosure, the electrical device can be integrated directly into a gear stage. It has proved to be especially advantageous if the sum gear stage is designed electromagnetically.

The integration according to the present disclosure of an electrical device into a differential arrangement can produce torque vectoring, which has conventionally been achieved by mechanical means. If the vehicle has a second electrical device in the drivetrain upstream of the input element of the differential, for example an appropriately dimensioned alternator or motor-generator in an electrically power-branched transmission, the torque of both output elements in the differential can be increased independently of one another by the circulating reactive power. Therefore only one electrical device may be necessary in order to achieve the same effect on both shafts, which has great advantages with respect to cost and installation space.

In a design according to the present disclosure of the gear stage as a magnetic gear unit, the permanent magnets are on three different rings, each coupled mechanically to a respective shaft. The rings generally have no mechanical contact and thus operate with force locking so that the gear unit produces only low frictional losses. The wear is limited largely to the supporting rolling-contact bearings. Therefore the noise generation is very low. Because the two shafts do not contact one another as in a gear wheel transmission, there is no need to use lubrication. In addition, it is possible to forgo shaft seals, which can lose their tightness after a certain time.

The design of the transmission stage as a magnetic gear unit makes it possible for the gear unit not to be damaged in case of an overload but rather to slip until the load decreases. After reduction of the drive speed, recoupling is possible. In addition high rotational speeds can be achieved. The variant according to the present disclosure makes it possible to forgo lubrication, and no abrupt accelerations can occur.

In an embodiment of the present disclosure, the arrangement does not have any whole-number fixed-carrier transmission ratios. It proves to be especially advantageous if the fixed-carrier transmission ratios are not exactly −1 or +2, but rather have a deviation from these values. These deviations may be more than 0.1%, more particularly more than 1%.

In one variant of the present disclosure, the differential is designed as a limited slip differential, more particularly as an electronically-controlled limited slip differential.

In an embodiment of the present disclosure, at least one differential shaft has permanent magnets. The permanent magnets may be surrounded by fixed coils.

FIG. 1 shows an agricultural utility vehicle 10 in which the differential arrangement 24 according to the present disclosure is used in order to implement an asymmetrical distribution of torques to two shafts. A central differential can also be used here.

Figure 2:
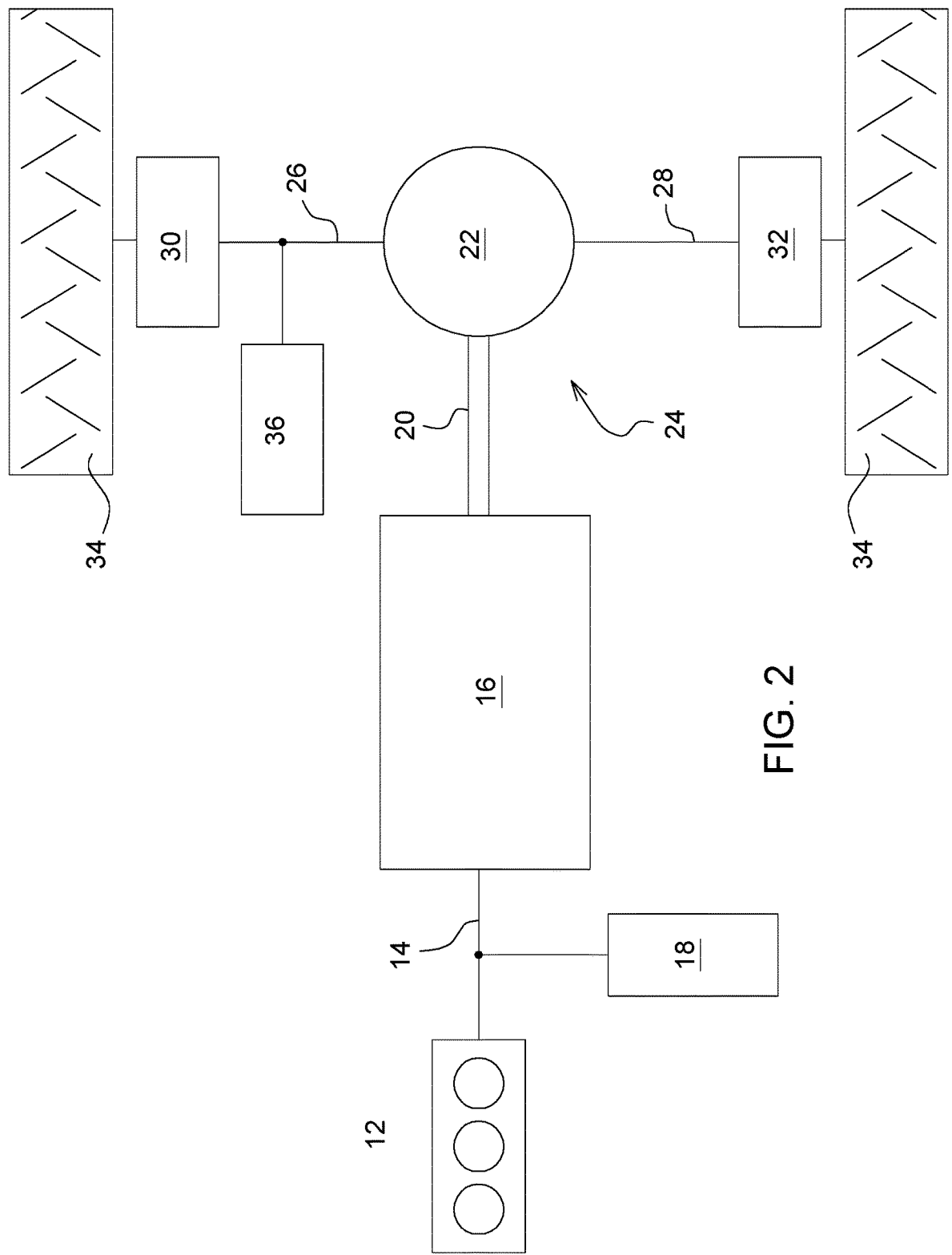
FIG. 2 illustrates a drive train with a differential arrangement in accordance with an embodiment of the present disclosure.

FIG. 2 shows a drive train with a differential arrangement 24 in a Wolf representation. The drive train comprises an engine 12, which can be designed as an internal combustion engine (ICE). A shaft 14 leads to a transmission 16. A motor-generator 18 is connected to the shaft 14. The motor-generator 18 may be an electrical generator or electrical machine that converts the rotational energy of the shaft 14 into electrical energy.

From the transmission 16, an input element 20 leads to a gear stage 22. The gear stage 22 is part of a differential arrangement 24.

A Wolf diagram is used for the representation. An epicyclic gear unit is represented by a circle with three outgoing lines, which represent three connection shafts. This symbolism, type and use is defined in VDI Guideline 672 [VDI 672].

The sum shaft, i.e. the shaft with the largest torque, is marked by a double line. The shaft can be designed as a solid shaft or a hollow shaft. The Wolf schematic shows the system structure in an abstract form, so that the embodiments can vary and are not determined by the illustration.

The gear stage 22 can be implemented as an electromagnetic gear stage or as a mechanical gear stage. From the gear stage 22, output elements 26, 28 lead to additional step-down gear units 30, 32 and further to wheels 34 of the vehicle 10.

According to the present disclosure, one output element 28 is connected to an electrical device 36. The electrical device 36 can be a motor-generator or an electrical machine that converts the kinetic energy of the output element 26 into electrical energy. The design according to the present disclosure makes it possible to modify the distribution of torque to the output elements 26, 28 dynamically.

Figure 3:
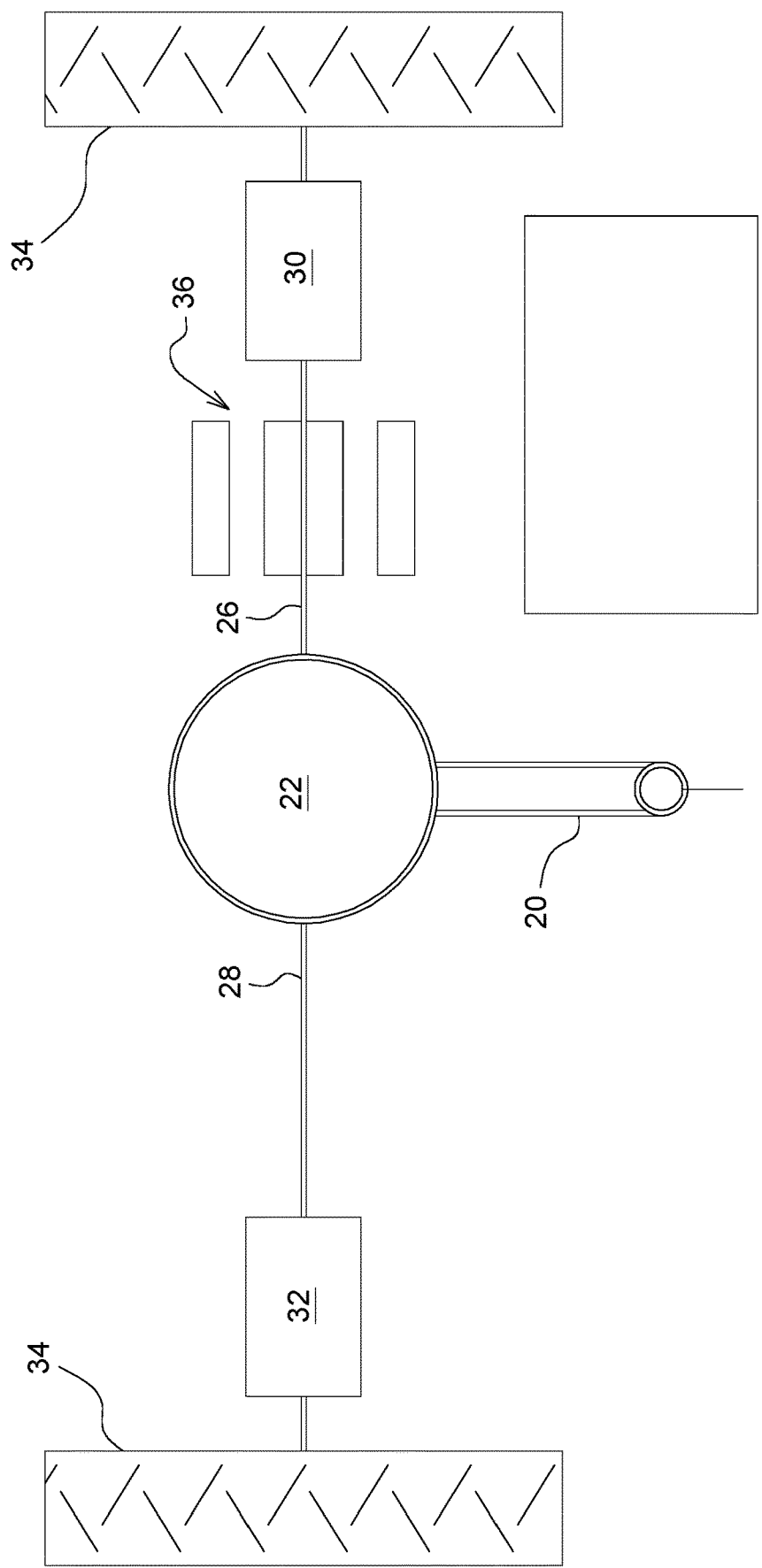
FIG. 3 illustrates a differential arrangement in accordance with an embodiment of the present disclosure.

FIG. 3 shows a variant in which the gear stage 22 is designed as an electromagnetic gear stage. The structure of such an electromagnetic gear stage is illustrated for the sake of example in FIG. 4.

Figure 4:
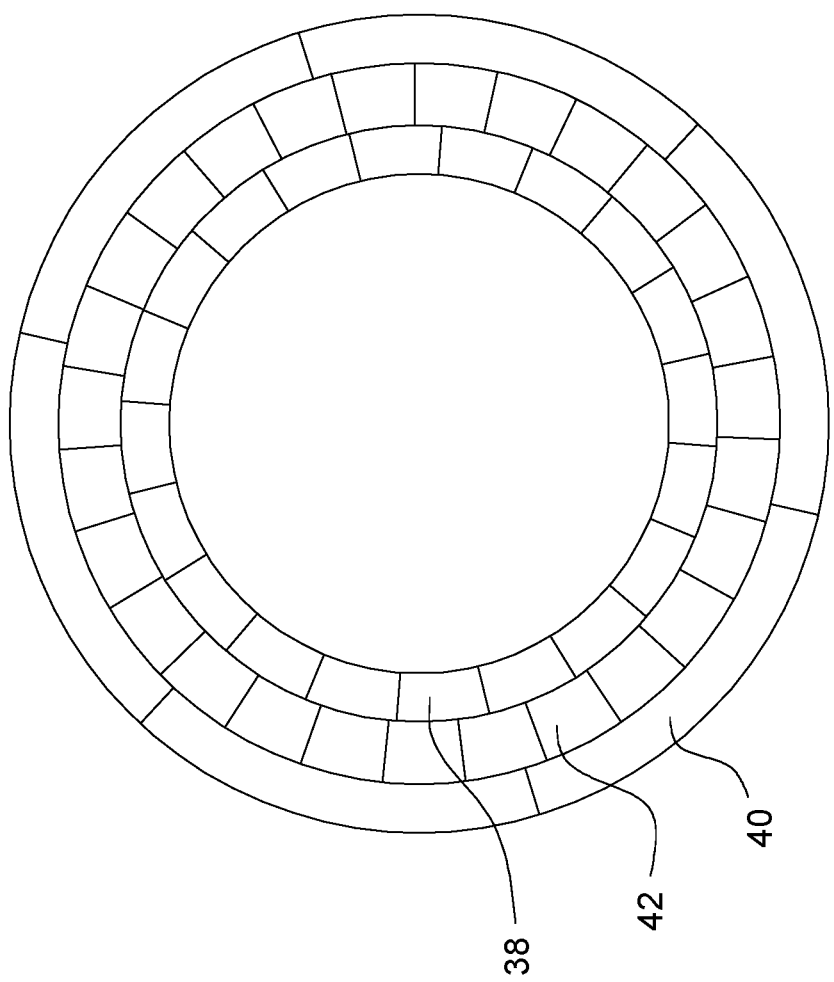
FIG. 4 illustrates a schematic representation of a magnetic gear stage.

FIG. 4 shows the gear stage 22, which is designed as a magnetic epicyclic gear unit. It consists of three rings 38, 40, 42 mounted rotatably relative to one another. The individual rings are concentrically mounted and have a common axis of rotation. A torque or power is introduced by the input element 20 designed as an input shaft, modulated inside the gear stage 22 and extracted by the output elements 26, 28 designed as output shafts. The gear stage 22, designed as an epicyclic gear unit, has an inner ring 38. The inner ring 38 has magnetic poles distributed on the periphery, which interact with the magnetic poles and ferromagnetic rods of the additional rings. The magnetic poles of the inner ring 38 can also be replaced by electromagnetic coils.

The inner ring 38 turns slowly at a low rotational speed and has more pole pairs than the outer ring 40. The outer ring 40, likewise formed as a ring, rotates fast at a higher rotational speed and has fewer pole pairs.

The center ring 42 is located radially between the outer ring 40 and the inner ring 38. The center ring 42 has ferromagnetic rods 44. The number of ferromagnetic rods 44 can be determined by design; they can also be implemented variably, however. The center ring 42 can have a plurality of concentric ring sections which are made to overlap by rotation, whereby a new number of ferromagnetic poles or ferromagnetic rods 44 can be selected. The ratio between the poles of the center ring 42 and of the inner ring 38 can be modified in that way.

The outer ring 40 has magnetic poles that are arranged distributed along the circumference. The magnetic poles can also be replaced by electromagnetic coils. They can be individually wound or designed as a distributed winding. The number of magnetic poles of the outer ring 40 differs from the number of magnetic poles on the inner ring 38.

The number of magnetic poles or coils on the outer ring 40 can be varied by means of an electronic controller. At least two different groups of magnetic poles can be connected. For this purpose, both groups of magnetic poles are already incorporated into the outer ring 40. In operation, one group of magnetic poles is connected in each case, while the second group remains inactive. The controller can increase the number of magnetic poles by connecting additional magnetic poles, or reduce the number by targeted disconnection.

With a fixed number of magnetic poles on the inner ring 38 and a fixed number of ferromagnetic rods on the center ring 42, there are two solutions for the number of magnetic poles on the outer ring 40. Particularly if the magnetic poles are replaced by electromagnetic coils, it is advantageous if the number corresponds to the lowest common multiple of the two solutions. In one design, both solutions can be implemented by the controller. Actuation can be realized by differing energization by means of an electrical circuit. Generation of a magnetic field with a three-phase alternating current is conventional. A different current curve can be chosen, but the number of coils may be recalculated for this.

The inner ring 38 has a higher number of pole pairs and a lower rotational speed relative to the outer ring 40. The inner ring 38 also has a higher torque.

Relative to the inner ring 38, the outer ring 40 has lower number of pole pairs and a higher rotational speed. The outer ring 40 also has a lower torque.

The inner ring 38 is connected to the input element 20. Each output element 26, 28 is connected to the outer ring 40.

An electrical device 36 designed as an electrical generator or electrical machine may be operated at a high rotational speed and a low torque. The design according to the present disclosure allows such an operation. By constructing the gear stage 22 as an electromagnetic gear stage having a slower-rotating inner ring 38 and a relatively faster-rotating outer ring 40, the electrical device 36 can easily be coupled via the outer ring 40.

Such a coupling of an electrical device 36 designed as electrical machine is illustrated schematically in FIG. 3. The electrical device may be integrated into the electromagnetic gear stage. The outer ring 40 can be formed as a difference shaft. Coils can be arranged around the outer ring 40.

The coupling to the outer ring 40 brings considerable advantages in comparison to a coupling to the inner ring 38, as is necessary in conventional gear unit arrangements. The outer ring 40 is much more easily accessible. Coupling to the outer ring 40 requires considerably less construction space.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A differential arrangement having comprising:
a gear stage that includes at least one input element and at least two output elements, wherein at least one output element is connected to at least one electrical device in order to distribute torque;
wherein the gear stage includes a magnetic three-shaft epicyclic gear unit including an inner ring having a number of pole pairs, an outer ring having a number of electromagnetic coils, and a center ring having a number of pole rods;
wherein the pole rods of the center ring are arranged such that the pole rods modulate a magnetic field between the first number of pole pairs and the number of electromagnetic coils;
wherein the first number of pole pairs of the inner ring is more than the number of electromagnetic coils of the outer ring;
wherein the inner ring has a slower rotational speed and a higher torque than the outer ring;
wherein the inner ring is connected to the at least one input element and the outer ring is connected to the at least two output elements;
wherein the inner ring, center ring, and outer ring are concentrically mounted, and the center ring is located radially between the outer ring and the inner ring;
wherein the number of electromagnetic coils of the outer ring includes a first group of electromagnetic coils and a second group of electromagnetic coils;
wherein the first group of electromagnetic coils has a different number of electromagnetic coils than the second group of electromagnetic coils;
wherein the first group of electromagnetic coils is connected and the second group of electromagnetic coils remains inactive in a first condition; and
wherein the number of connected electromagnetic coils can be varied by disconnecting the first group of electromagnetic coils and connecting the second group of electromagnetic coils in a second condition.

2. The differential arrangement according to claim 1, wherein the electrical device is integrated into the differential arrangement.

3. The differential arrangement according to claim 2, wherein the electrical device is integrated into the gear stage.

4. The differential arrangement according to claim 1, wherein the center ring includes a plurality of overlapping concentric ring sections.

5. The differential arrangement according to claim 1, wherein the electrical device is integrated into the gear stage via the outer ring.

6. The differential arrangement according to claim 1, wherein the outer ring is constructed as a difference shaft and coils are arranged around the outer ring.

7. The differential arrangement according to claim 1, wherein the at least one input element is a sum shaft and is mechanically driven, and wherein each of the at least two output elements is connected to a shaft.

8. The differential arrangement according to claim 1, wherein the differential arrangement comprises a fixed-carrier transmission ratio, the fixed-carrier transmission ratio being a non-whole number fixed-carrier transmission ratio.

9. The differential arrangement according to claim 8, wherein the fixed-carrier transmission ratio is not exactly −1 or +2 but a deviation of at least one of these values, wherein the deviation is at least 0.1%.

10. The differential arrangement according to claim 8, wherein the fixed-carrier transmission ratio is not exactly −1 or +2 but a deviation of at least one of these values, wherein the deviation is at least 1%.

11. The differential arrangement according to claim 1, wherein the gear stage comprises a limited-slip differential.

12. The differential arraignment according to claim 1, wherein the gear stage comprises an electronically controlled limited-slip differential.

13. The differential arrangement according to claim 1, wherein the at least one electrical device is connected to at least one further electrical device integrated into the differential arrangement.

14. A method of influencing the overall torque of a shaft using a differential arrangement having a gear stage comprising at least one input element and at least two output elements, at least one output element of the at least two output elements being connected to at least one electrical device, the method comprising:
combining a differential lock with the at least one electrical device;
wherein the gear stage includes a magnetic three-shaft epicyclic gear unit including an inner ring having a first number of pole pairs, an outer ring having a number of electromagnetic coils, and a center ring having a number of pole rods;
wherein the pole rods of the center ring are arranged such that the pole rods modulate a magnetic field between the number of pole pairs and the second number of electromagnetic coils;
wherein the number of pole pairs of the inner ring is more than the number of electromagnetic coils of the outer ring;
wherein the inner ring has a slower rotational speed and a higher torque than the outer ring;
wherein the inner ring is connected to the at least one input element and the outer ring is connected to the at least two output elements;
wherein the inner ring, center ring, and outer ring are concentrically mounted, and the center ring is located radially between the outer ring and the inner ring;
wherein the number of electromagnetic coils of the outer ring includes a first group of electromagnetic coils and a second group of electromagnetic coils;
wherein the first group of electromagnetic coils has a different number of electromagnetic coils than the second group of electromagnetic coils;
wherein the first group of electromagnetic coils is connected and the second group of electromagnetic coils remains inactive in a first condition; and
wherein the number of connected electromagnetic coils can be varied by disconnecting the first group of electromagnetic coils and connecting the second group of electromagnetic coils in a second condition.

15. The method of claim 14, wherein the center ring includes a plurality of overlapping concentric ring sections.

* * * * *